United States Patent [19]

Perusse et al.

[11] 3,897,297

[45] July 29, 1975

[54] TUBULAR ARTICLE FORMING APPARATUS

[75] Inventors: Norman J. Perusse; William E. Rejeski, both of Farmington, Conn.

[73] Assignee: The Wiremold Company, West Hartford, Conn.

[22] Filed: Sept. 12, 1973

[21] Appl. No.: 396,529

[52] U.S. Cl. ............. 156/428; 93/80; 138/129; 138/144; 138/154; 156/190; 156/195; 156/425; 156/429; 156/448
[51] Int. Cl. ............. B31c 1/00; B31c 5/00
[58] Field of Search .......... 156/130, 143, 187, 188, 156/190, 191, 195, 397, 425, 427, 428, 429–432, 448–450, 453, 457, 554, 446, 455, 468, 471, 475, 495; 93/77 R, 77 CL, 94 R, 94 M, 80; 72/135; 138/129, 144, 154

[56] References Cited
UNITED STATES PATENTS

| | | | |
|---|---|---|---|
| 1,885,587 | 11/1932 | Burton | 156/195 |
| 1,941,993 | 1/1934 | Minton | 156/428 |
| 2,405,909 | 8/1946 | Smith et al. | 156/195 |
| 3,468,733 | 9/1969 | Dunlap et al. | 156/195 |
| 3,548,724 | 12/1970 | Hall | 156/195 |
| 3,690,993 | 9/1972 | Hawerkamp | 156/429 |

*Primary Examiner*—Clifton B. Cosby
*Assistant Examiner*—John E. Kittle
*Attorney, Agent, or Firm*—Prutzman, Hayes, Kalb & Chilton

[57] ABSTRACT

Tubular article forming apparatus having a mandrel assembly with a fixed tubular support mandrel and an idler support belt extending helically for generally one helical wrap around the tubular support mandrel and around internal guide rolls mounted within the support mandrel and a drive belt mechanism with an outer drive belt with generally one helical wrap overlying the helical wrap of the support belt and cooperating therewith to draw tubular article forming material onto and helically around the mandrel assembly, secure overlapping portions of the material together and feed the formed tubular article off the mandrel.

11 Claims, 3 Drawing Figures

TUBULAR ARTICLE FORMING APPARATUS

BRIEF SUMMARY OF THE INVENTION

The present invention relates generally to apparatus for manufacturing tubular articles of elongated helically wound material by feeding the material generally helically around a mandrel.

It is a principal aim of the present invention to provide a new and improved tubular article forming apparatus for feeding elongated tubular article material around a generally helical path to form the tubular article.

It is another aim of the present invention to provide a new and improved mandrel assembly for tubular article forming apparatus for freely feeding the material around a helical path without frictional resistance of the material.

It is another aim of the present invention to provide a new and improved mandrel for tubular article forming apparatus which facilitates high speed low-cost production of tubular articles.

It is a further aim of the present invention to provide a new and improved mandrel design for tubular article forming apparatus which is useful in producing small, intermediate and large diameter tubular articles.

It is another aim of the present invention to provide new and improved tubular article forming apparatus which provides for feeding elongated tubular article material along a helical path without any undesirable material distortion.

It is a further aim of the present invention to provide new and improved tubular article forming apparatus which provides for firmly and accurately feeding the tubular article material around a helical path.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
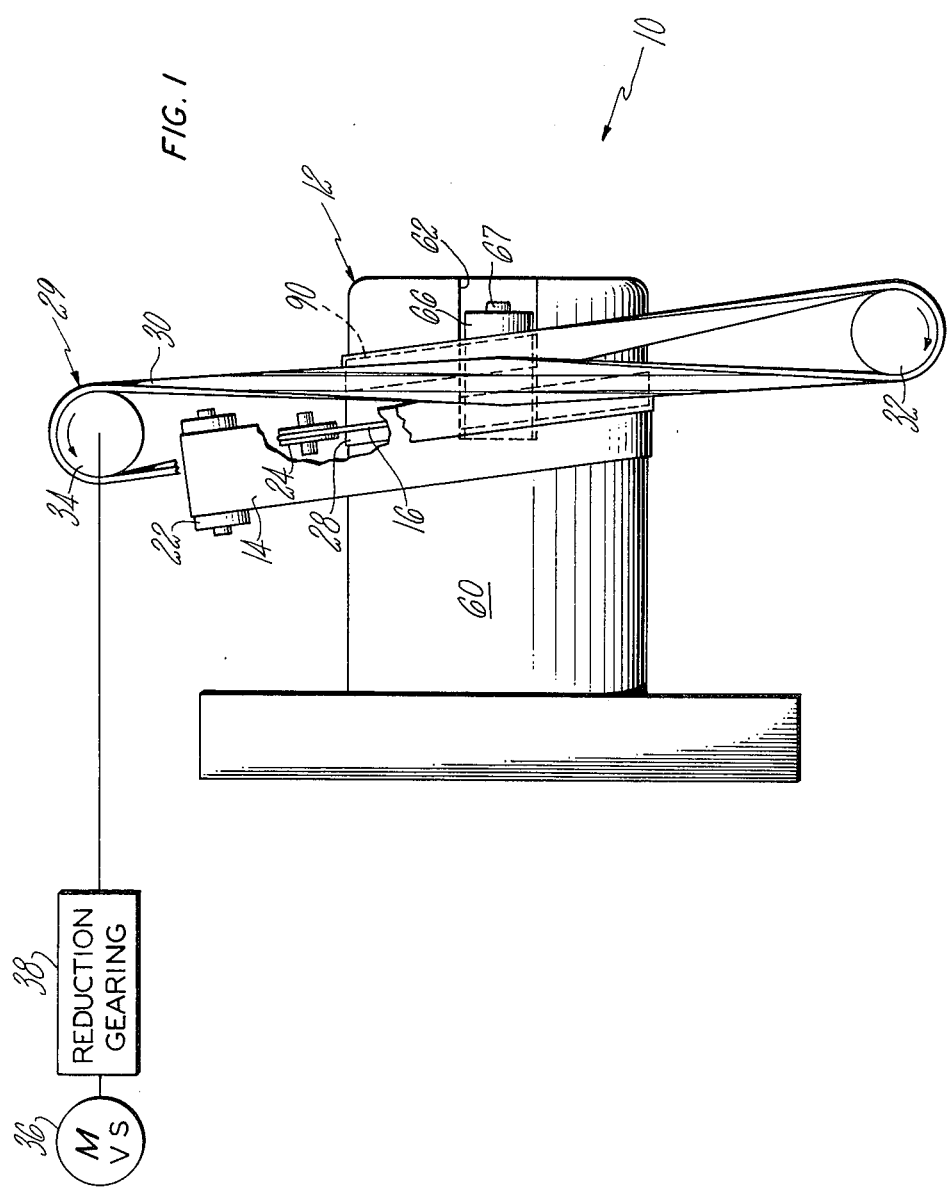
FIG. 1 is a partly diagrammatic and partly schematic view, partly broken away, of a tubular article forming apparatus incorporating an embodiment of the present invention.
Figure 2:
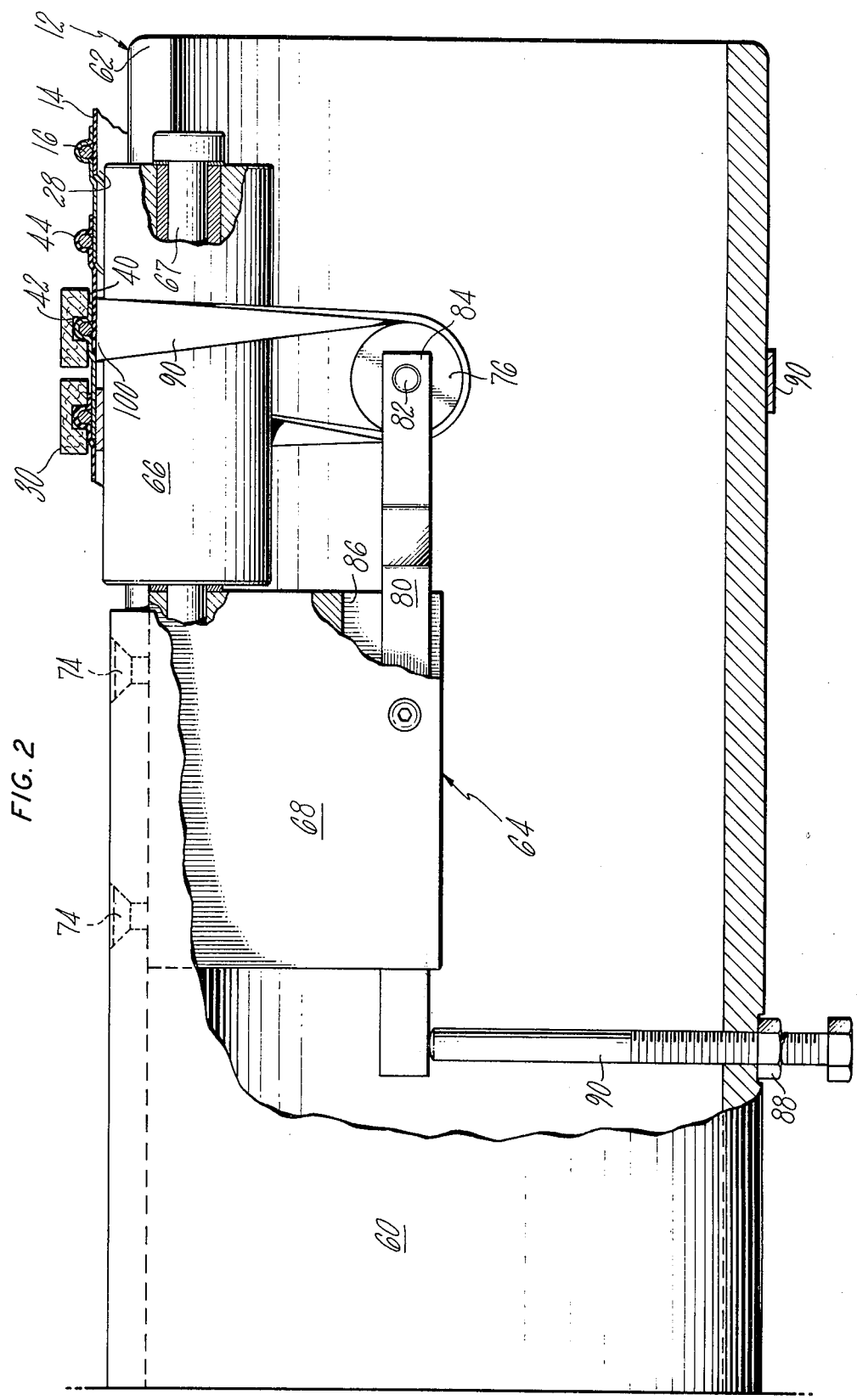
FIG. 2 is an enlarged partial transverse section view, partly broken away and partly in section, of the tubular article forming apparatus.
Figure 3:
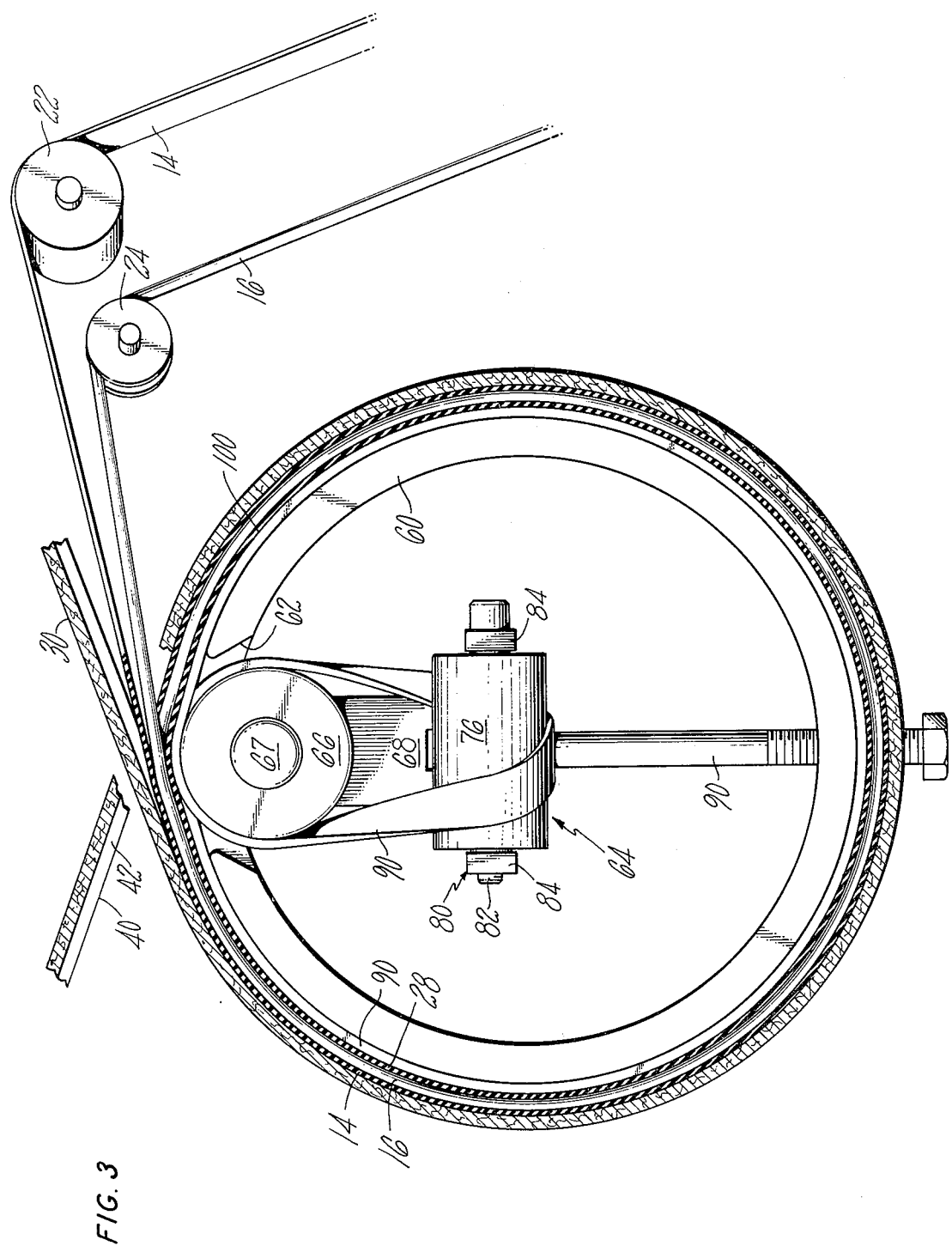
FIG. 3 is an enlarged partial longitudinal section view, partly broken away and partly in section, of the tubular article forming apparatus.

Referring now to the drawings in detail wherein like numerals designate like parts, a tubular article forming apparatus 10 incorporating an embodiment of the present invention comprises a tube forming mandrel assembly 12 for receiving elongated web and reinforcing wire material 14, 16 respectively. The web material 14 is fed tangentially to the mandrel assembly 12 from a suitable rotatable supply roll (not shown) via a rotatable guide roll 22. The reinforcing wire material 16 is similarly fed tangentially to the mandrel assembly 12 from a suitable rotatable supply roll (not shown) via a rotatable guide roll 24. The web 14 and reinforcing wire 16 are fed onto the mandrel assembly 12 at substantially the same linear rate and at substantially the same acute angle to the longitudinal axis of the mandrel assembly 12 (in the shown embodiment at an acute angle of approximately 82 degrees) such that the web and wire material are fed together tangentially to the mandrel assembly 12 and then, as hereinafter more specifically described, helically around the mandrel assembly 12 to form a tubular article. The web 14 is wider than the pitch of the helical path of the web and wire material such that each succeeding wrap of web 14 overlaps the preceding wrap. The reinforcing wire 16 is fed onto the preceding helical wrap of web 14 adjacent its trailing edge 28 and underneath the succeeding wrap of web 14 adjacent its leading edge and such that a suitable intermediate web and wire sandwich construction is formed. The web 14 is preferably suitably treated, for example by applying strips of a suitable adhesive (not shown) onto the trailing edge of the web as it is fed to the mandrel assembly 12, so that the engaging overlapping portions of web on both sides of the reinforcing wire 16 quickly adhere together to complete the tubular article which is then fed forwardly off the mandrel assembly 12 and cut into suitable lengths as desired.

An external drive belt assembly 29 is employed for assisting in firmly feeding the web and wire material onto the mandrel assembly 12. The external drive belt assembly 29 comprises an overlying endless drive belt 30, an idler pulley 32 and a drive pulley 34 driven by a suitable variable speed motor 36 through reduction gearing 38. The idler and drive pulleys 32, 34 are suitably mounted above and on opposite sides of the mandrel assembly 12 and the drive belt 30 extends partly around the pulleys 32, 34 and once around the intermediate mandrel assembly 12. More particularly, the drive belt 30 passes from the drive pulley 34 to the mandrel assembly 12 and then helically over and around the mandrel assembly 12 at substantially the same pitch angle as the web and wire material and then to the idler pulley 32 and back to the drive pulley 34. The drive belt 30 is therefore driven along a helical path around the mandrel assembly 12 and such that the drive belt 30 remains in engagement with the web and wire material for substantially one full turn. As can be best seen in FIG. 1, the drive belt 30 passes generally centrally over the reinforcing wire 16 and engages the adjacent overlapping edge portions of the successive wraps of web 14. Also, as shown, the inner or working face 40 of the drive belt 30 preferably has a central groove 42 contoured to receive and thereby assist in forming with the reinforcing wire 16 a helical ridge 44 around the formed tubular article and such that the outer portions of the working face 40 of the drive belt 30 press the overlapping web portions together. The drive belt 30 is made suitably taught to ensure that the overlapping web portions are firmly held in engagement to be intergrally secured together as the web and wire material is helically fed around the mandrel assembly 12.

The mandrel assembly 12 comprises a fixed generally cylindrical tubular support mandrel 60 having an axially extending slot 62 at its forward end and a support belt mechanism 64 mounted on the support mandrel 60 for cooperation with the drive belt 30 to support the web and reinforcing wire material as it is fed helically around the support mandrel 60. The support belt mechanism 64 comprises an axially extending outer cylindrical roll 66 mounted within the tubular support mandrel 60 along the slot 62 with its axis extending parallel to the axis of the support mandrel 60. The outer roll 66 is shown rotatably mounted on a fixed support pin 67 extending axially forwardly from a mounting block 68 suitably secured within the tubular support mandrel 60 as by threaded fasteners 74. A second transversely extending cylindrical roll 76 is mounted within the tubular support mandrel 60 generally centrally below the outer roll 66. The inner roll 76 is shown rotatably mounted on a support pin 82 extending between the spaced ends 84 of a bifurcated lever 80, and the lever 80 is pivotally mounted within a lower axially extending slot 86 in the mounting block 68. The axis of the inner roll 76 is shown perpendicular to the axis of the outer roll 66. An adjustment screw 90 threaded through the tubular support mandrel 60 engages the rear end of the level 80 and is adjustable to radially position the inner roll 76 relatively to the outer roll 66. A lock nut 88 is provided for locking the adjustment screw in its adjusted position.

A flat endless idler support belt 90 is mounted to extend helically around the support mandrel 60 for generally one full wrap directly below the outer helical wrap of the drive belt 30 and such that the helically extending web and wire material are supported therebetween. The endless support belt 90 passes from the support mandrel 60 over and down one side of the outer roll 66, around the underside of the inner roll 76 and upwardly and over the other side of the outer roll 66 and onto the support mandrel 60. The inner roll 76 is radially adjusted to establish the desired belt tension and preferably so that the belt feeds relatively easily around the support mandrel 60. The outer roll surface is slightly outwardly of the circumference of the support mandrel 60 so that the endless support belt 90 passes tangentially to and from the support mandrel 60. The diameter of the inner roll 76 is selected to establish the desired helical pitch of the support belt 90 which should be substantially equal to the helical pitch of the overlying drive belt 30 and the helical pitch of the web and wire material of the formed tubular article.

It can be seen that the inner roll 76 and outer roll 66 together provide internal rotatable guide roll means radially internally of the helical path of the tubular article material 12, 14 for returning the support belt 90 rearwardly from a first relatively forward end or point of its helical path to a second relatively rearward end or point of its helical path and therefore assure that the support belt 90 continues to be fed around the same helical path tangentially from the outer roll 66 of the internal guide roll means onto the support mandrel 60, around the support mandrel 60 and tangentially from the mandrel back to the outer roll 66 of the internal guide roll means.

The drive belt 30 and support belt 90 cooperate to firmly draw the web and wire material onto the mandrel assembly, and the web and wire material are preferably suitably restrained for feeding the material to the mandrel under slight tension, and for pressing the overlapping portions of the web material in firm engagement for bonding them together. One helical wrap of the overlying and underlying belts has been found to be sufficient to adequately secure the overlapping portions of web material together.

Thus, the idler support belt 90 provides a simple and reliable mechanism for supporting and carrying the web and wire material helically around the support mandrel 60 and for assisting in bonding the overlapping portions of web material together. The web and wire material does not contact and is therefore not frictionally restrained by the outer surface of the fixed support mandrel 60 during the forming process. Also, the outer diameter of the helical support face 100 provided by the support belt 90 is slightly greater than the outer diameter of the support mandrel 60, and the formed tubular article is therefore free to be fed forwardly off the mandrel with minimum frictional resistance. Further, the outer roll 66 being positioned such that its outer surface extends slightly radially outwardly beyond the circumference of the support mandrel 60, the inside diameter of the formed tubular article will be slightly greater than the diameter of the helical support face 100 to further facilitate feeding the tubular article forwardly off the mandrel assembly 12. The diameter of the tubular article can be varied slightly by varying the diameter of the outer roll 66.

The foregoing design can be made in any appropriate size to form tubular articles of any desired size and is useful for producing tubular articles at high speed and therefore at low cost per unit length. The employed tubular article material is firmly and substantially positively drawn onto the mandrel assembly and fed helically around the mandrel assembly without any undesirable material distortion and such that the tubular article can be formed in one turn and then fed forwardly off the mandrel assembly. The support belt 90 supports the material so that there is no frictional resistance between the tubular article material and the fixed mandrel 60. Consequently, the web material does not need to be lined or internally treated in any manner to facilitate feeding the tubular article material around and forwardly off the mandrel.

As will be apparent to persons skilled in the art, various modifications, adaptations and variations of the foregoing specific disclosure can be made without departing from the teachings of the present invention.

We claim:

1. In a tubular article forming apparatus for forming a tubular article of elongated generally helically coiled material and having a mandrel assembly for supporting the material for forward movement along a generally helical path therearound for helically coiling the material into a tubular article, the improvement wherein the mandrel assembly comprises an internal endless support belt for internally supporting the tubular article material, a support mandrel supporting the support belt for forward generally helical movement around the support mandrel along a generally helical path from a first relatively rearward point to a second relatively forward point of the helical path of the support belt, and internal guide roll means mounted on the support mandrel radially internally of said generally helical path of said material for supporting and guiding the endless support belt for continuous movement from said forward point to said rearward point radially internally of said generally helical path of the material, the internal guide roll means and support mandrel supporting the endless belt for unimpeded continuous movement along said generally helical path of the support belt for supporting said material for forward movement along its generally helical path around the mandrel assembly; and wherein the tubular article forming apparatus comprises an external belt assembly having an external endless belt extending generally helically around the mandrel assembly along a generally helically path thereof extending along at least part of the generally helical path of the support belt for gripping and supporting said material therebetween and carrying the material forwardly generally helically around the mandrel assembly along its generally helical path, and drive means connected for driving at least one of the endless belts for driving the material helically around the mandrel assembly.

2. In a tubular article forming apparatus for forming a tubular article of elongated generally helically coiled material having a mandrel assembly for supporting the material for forward movement along a generally helical path therearound for helically coiling the material into a tubular article, the improvement wherein the mandrel assembly comprises a generally cylindrical mandrel core having slot means therein, rotatable roll means mounted within the mandrel core and an endless idler support belt having a first continuous helically extending section thereof extending generally helically around the mandrel core between rearward and forward ends thereof and a second continuous section thereof extending from the forward end of the helical section through the slot means in the mandrel core and around the internal rotatable roll means and through the slot means to the rearward end of the helical section, the rotatable roll means comprising a first axially extending rotatable outer roll with an outer guide roll surface generally tangential to said path of generally helical movement of the support belt and a second transversely extending rotatable inner roll, the endless support belt passing forwardly over and down one side of the outer roll, under the inner roll and up to the other side and over the outer roll, the endless idler support belt being supported by the rotatable roll means and mandrel core to permit the endless belt to support the material on the first continuous helically extending section thereof for movement generally helically around the mandrel assembly.

3. A tubular article forming apparatus according to claim 1 wherein the drive means is connected for driving the external endless belt.

4. A tubular article forming apparatus according to claim 1 wherein the internal guide roll means comprises a generally axially extending outer rotatable roll having a belt guide surface for the support belt tangential to the path of generally helical movement of the support belt and wherein the support belt passes forwardly over and down one side of the outer roll from the forward point and feeds forwardly up the other side and over the outer roll to the rear point.

5. A tubular article forming apparatus according to claim 4 wherein the belt guide surface of the outer roll extends slightly radially outwardly of the circumference of the support mandrel.

6. A tubular article forming apparatus according to claim 1 wherein the support belt is supported on the support mandrel for movement along a generally helical path having generally one turn.

7. A tubular article forming apparatus according to claim 1 wherein the guide roll means comprises a transversely extending rotatable roll within the support mandrel.

8. A tubular article forming apparatus according to claim 1 wherein the internal guide roll means comprises a first axially extending rotatable outer roll with an outer guide roll surface generally tangential to said path of generally helical movement of the support belt and a second transversely extending rotatable inner roll and wherein the endless support belt passes forwardly over and down one side of the outer roll, under the inner roll and up the other side and over the outer roll.

9. A tubular article forming apparatus according to claim 8 further comprising adjustment means for adjusting the inner roll for adjusting the tension of the support belt.

10. A tubular article forming apparatus according to claim 8 wherein the outer and inner rolls are angularly related to each other and to the axis of the support mandrel such that the rolls provide for continuously feeding the endless support belt from the forward point of its path of generally helical movement to its rearward point.

11. A tubular article forming apparatus according to claim 1 wherein the support belt is an idler belt.

* * * * *